Oct. 11, 1960     R. M. AUBRY     2,955,395
GLASS PACKAGING
Original Filed Dec. 8, 1958     2 Sheets-Sheet 1
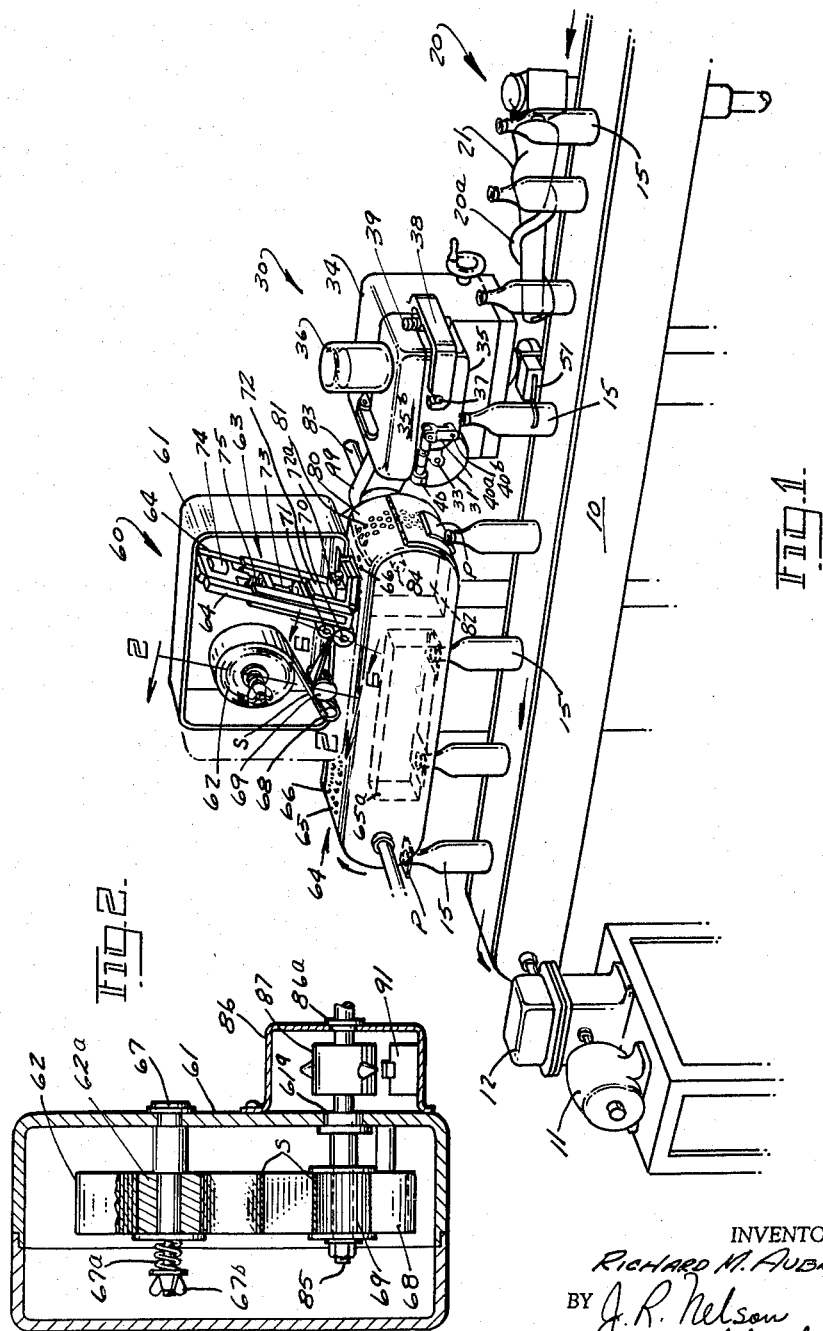
INVENTOR.
RICHARD M. AUBRY
BY J. R. Nelson
 + W. A. Schaich
ATTORNEYS Oct. 11, 1960 R. M. AUBRY 2,955,395
GLASS PACKAGING
Original Filed Dec. 8, 1958 2 Sheets-Sheet 2

INVENTOR.
RICHARD M. AUBRY
BY J. R. Nelson
+ W. A. Schaich
ATTORNEYS

United States Patent Office 2,955,395
Patented Oct. 11, 1960

2,955,395

GLASS PACKAGING

Richard M. Aubry, Toledo, Ohio, assignor to Owens-Illinois Glass Company, a corporation of Ohio Original application Dec. 8, 1958, Ser. No. 778,740. Divided and this application July 27, 1959, Ser. No. 829,844

3 Claims. (Cl. 53—71)

The present invention relates to the packaging of glass and, particularly, glass containers.

Manufacturers of glass containers, e.g., bottles and the like, conveniently ship them to their customers in corrugated cartons. Frequently, partitioning members are included which serve to separate the bottles one from the other, thus avoiding contact, scratching, and breaking. It has been found, however, that finely divided paper from the partitions, and other dust, dirt, and foreign objects find their way into the glass containers. This is extremely objectionable to the customer, particularly where the container or bottle involved is to be filled with a comestible product. In these situations, the customer finds that he has to take special precautions to check the containers for such, and install procedures for removal of the foreign objects, and even the washing and sterilization of the inside.

The present application is a divisional of my copending application Serial No. 778,740, filed December 8, 1958.

It is, accordingly, a principal object of this invention to provide an apparatus for protecting glass containers so that the foregoing problem is avoided.

It has previously been proposed to cap the opening of the glass containers to avoid the above-described problem. However, those arrangements known heretofore have been either prohibitively expensive or subject to other problems just as undesirable. One arrangement that has been suggested and used involves a strip of paper having one side completely coated with a pressure-sensitive adhesive. The strip is severed into lengths and pressed firmly onto the rim. This does not work too satisfactorily, however, because it has been found that such seals do not strip cleanly from the surface of the glass bottle rim. Further, the adhesively coated strip of paper is undesirable because it is found that the vapor in the air at the time the seal is applied frequently condenses in the interval between the time of sealing and the time that the bottle is to be used by the customer. Unfortunately, the droplets of water formed in condensation are not able to evaporate due to the complete sealing of the opening. As a result, the water collects in the bottom of the bottle and, particularly if allowed to stand for extended periods, attacks the bottle, taking into solution alkali metal ions so that the water becomes progressively alkaline. The more alkaline or basic the water becomes, the more corrosive is its nature, so that finally the inside surface of the bottle, or at least a portion thereof, becomes attacked, pitted, and weakened.

It is, therefore, still another object of the present invention to provide apparatus which is designed to continuously and in sequence apply appropriate adhesive to the glass container mouth, apply in timed sequence a pad of paper, apply heat and pressure thereto to thereby provide a temporarily sealed glass container which may be conveniently handled and shipped without fear of entry of foreign materials therein.

It is also an object of this invention to provide an apparatus for such purpose which is automatically and continuously operable, and includes a provision initiating the sequence of operations only when a bottle is fed to the first stage of the apparatus.

The foregoing and other objects of this invention will become apparent to those skilled in the art from the following detailed description, taken in conjunction with the annexed drawings, on which there is presented for purposes of illustration only, a particular embodiment of the invention.

In the drawings:

Fig. 1 is a perspective view of the apparatus of the invention, illustrating the manner in which the method of this invention is practiced, portions of the apparatus being broken away for purposes of clarity.

Fig. 2 is a sectional view taken on the line 2—2 of Fig. 1.

Figure 3:
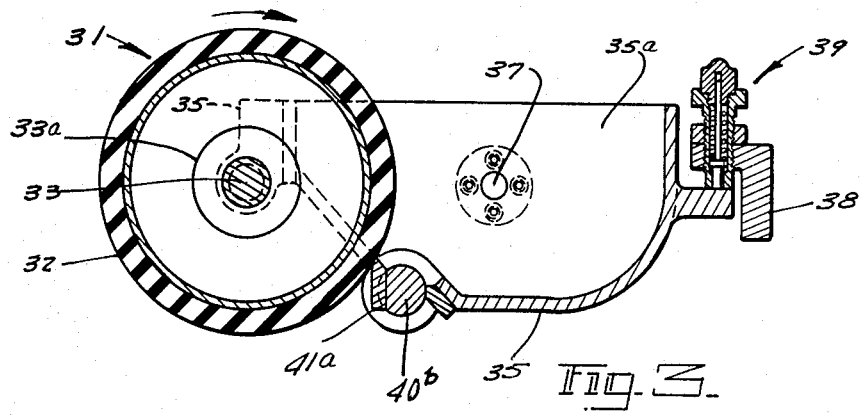
Fig. 3 is a partial sectional view of the adhesive applicator portion of the apparatus.

Basically, the present invention is embodied in a process which includes the steps of arranging glass containers in upstanding, spaced relationship, advancing the bottles in uniform fashion, applying an adhesive which possesses an affinity for paper which is greater than its affinity for glass to the mouth-defining rim of the container, applying in sequence a swatch or pad of paper so as to cover the mouth or opening, and firmly pressing the paper pad into sealing contact with the adhesively coated rim, while concurrently applying heat to cure and harden the adhesive and effect a firm bond between the paper and the rim of the container. The invention also contemplates apparatus adapted to carry out the steps of the process in continuous sequence and in automatic fashion.

Referring now more specifically to the drawings, there is shown in Fig. 1 the apparatus of the invention which includes a horizontal conveyor 10 driven by an electric motor 11, connected thereto through a gear box 12. The conveyor may be supported in any convenient fashion, but is controlled by the elements mentioned, so that the travel is in the direction indicated by the arrows, namely, from right to left as viewed in Fig. 1. A number of bottles 15 are located in upright fashion on the conveyor. As they proceed from right to left, the bottles pass adjacent to a spacer 20, an adhesive-applying station 30, and a disk or pad applicator 60. The spacer 20 is composed essentially of a motor driven (not shown), elongated, in-feed worm 21 projecting over the conveyor 10, and angularly with respect to its axis. The convolutions 20a on the in-feed worm, being uniform, serve to arrange the bottles in equidistantly spaced relationship.

The glue applicator 30 is composed in part of a rotatable roller 31, having a rubber contact surface 32. The roller 31 is mounted on a drive shaft 33, connected through a gear box to a variable speed motor (not shown) located in the housing 34. The shaft 33 rotates in bearings 33a mounted in a chamber-defining structure 35. The adhesive-applying wheel is driven to rotate clockwise, so as to not upset the bottles as they pass therebeneath and in contact with the lowermost portion of the adhesive application wheel. In rotating, the adhesive applicator roller 32 passes into the "glue pot" chamber 35a, which is provided with an adhesive reservoir in the form of an inverted bottle 36 mounted thereabove in a cover 35b. To avoid leaking, the shoulder of the inverted bottle 36 seats in a rubber-like gasket (not shown)

mounted in the cover 35a in such fashion that the mouth of the bottle projects through the cover. The chamber 35 is pivotable about the stud 37 resting in the cradle arm member 38 extending around from the housing member 34. The other side of the chamber is similarly mounted. By means of the adjusting screw arrangement 39, the chamber 35, including the adhesive applicator roll 32, can be pivoted about the stud 37 so as to permit the height of the adhesive applicator roll to be varied with respect to the conveyor, thus accommodating various sized bottles. The amount of adhesive laid down on the rim of the bottle is accurately controlled by the micrometer type screw 40, connecting through a yoke arm 40a to a shaft 40b, which bears a doctor blade 41a. Adjustment of the micrometer screw varies the angle between the doctor blade 41a with the rubber-like surface 32 of the adhesive applicator roll 31, thus controlling the amount of adhesive adhering to the surface thereof as it passes clockwise from within the chamber 35a in contact with the glue, downwardly into contact with the rim of the bottle passing therebeneath. Beneath the adhesive applicator, and projecting into the path of the bottles, is located a start microswitch 51, which, when tripped by the passage of a bottle, initiates the operation of the paper disk or pad-dispensing unit 60, in a manner to be described more fully hereinafter.

The paper-dispensing unit 60 is composed of a housing member 61 shown cut-away (Fig. 1) to reveal generally a roll of paper 62 in strip form, paper strip supporting roller 68, drive roller 69, cooperating strip stiffening rollers 70 and 71, and a cutter assembly 63. Below this is positioned a conveyor 64 to receive the cut swatch or pad of paper. The conveyor 64, particularly belt 65, is located to deliver a cut pad of paper to the bottle tops and press it to the top of the bottle. A heat source 65a is positioned interiorly of the conveyor 64 to heat the belt 65. Any source of heat may be used, although electric strip heaters are conveniently used due to ease of control of the temperature. The conveyor belt 65 is conveniently driven by connecting it through a conventional power transmitting arrangement to the motor in the housing 34 of the adhesive applicator unit, as generally indicated at 99 (Fig. 1). The conveyor 64 is in spaced, parallel relationship with the bottle-carrying conveyor 10, but rotates in opposite direction. As a consequence, the lowermost path of the conveyor will move in the same direction as the bottles. The linear speed of the belt 65 is also controlled to correspond with the linear speed of the conveyor 10. Both the conveyor belt 65 and the adhesive applicator roll 31 rotate continuously. This is advantageous because the conveyor belt 65 will be maintained at a uniform temperature while the glue applicator roll 32 will not become clogged, as might occur if operated intermittently.

Figure 6:
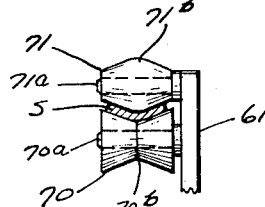
Fig. 6 is a sectional view taken on the line 6—6 of Fig. 1.

The roll of paper 62 is conveniently placed on a core 62a which is fitted onto a shaft 67. One end of the shaft 67 bears a spring 67a engaging the core 62a and held by a wing nut 67b. These are adjusted so that the roll will not freely unroll unless a positive pull is exerted by the knurled or corrugated drive roll 69. The strip of paper S first passes, however, down and about a wrap roller 68, then up, over, and slightly downwardly over the drive wheel 69, which, as indicated, is knurled, corrugated, or the like, to increase frictional contact with the strip of paper. The strip is next projected through a pair of co-operating rollers 70 and 71 (Figs. 1 and 6). These are rotatably mounted on shafts 70a and 71a, respectively, projecting from housing 61. The roller 70 is grooved as at 70b, while the roller 71 is bulged as at 71b. The rollers serve to provide a slight crease along the longitudinal axis of the strip of paper, thus stiffening it so that it will project outwardly beyond into the cutter assembly 63.

About any type of paper can be used in the practice of the present invention. Economics, of course, is an important factor, while of more importance is the fact that the paper must not be too limp, and should have appreciable affinity for the adhesive used to temporarily affix the paper to the rim of the bottle. In addition, the paper should desirably have some porosity, whereby it will allow water vapor to pass therethrough. It has been found that kraft-type liner sheet stock in rolled strip form is possessed of the desired combination of the above characteristics, and has been successfully used in the practice of the invention as described herein.

The cutter includes a pair of spaced guide rails 64, having slidably mounted therebetween a knife-blade 72 which passes, at its lowermost position, a cooperating shear block 72a. A rod 73 connected to blade 72 extends upwardly therefrom, and is receivable in a solenoid element 74, actuated to propel the knife-blade assembly downwardly in the guide-ways 64. The knife and rod are spring-loaded as at 75 in a manner to return the knife assembly to its uppermost position after each cutting operation. As the paper strip passes between the blade and shear block, the solenoid will be actuated, as explained more fully hereinafter, to initiate the cutter and sever a length of paper P. The severed paper will then fall onto the surface of a conveyor belt 65 which is perforated as at 66. In its passage about the right end of the conveyor 64, the belt 65 passes about a cylindrical surface 80, perforated as at 81. The perforations 81 communicate with a chamber 82 which is maintained under vacuum by any convenient vacuum source, through the pipe 83 connecting with the chamber as at 84. At any one time, certain of the perforations 66 are in registry with the perforations 81, and, accordingly, the paper, in passing around the right end of the conveyor arrangement 64, is held by the vacuum or suction arrangement in contact with the conveyor, and thus does not fall off. As the bottle passes underneath the conveyor in timed sequence, the swatch or severed length of paper is there to meet it, and is pressed by the conveyor belt into firm contact with the adhesive-coated rim. As the path of the conveyor returns to the horizontal, the pad and the bottle pass away from the vacuum chamber and beneath the heating source 65a mounted within the conveyor system 64. The combination of the heat and the pressure imparted by passage between the conveyors 64 and 10 serves to expedite the curing of the adhesive and effect a good bond between the rim, the adhesive, and the paper closure.

The drive roll 69, which serves to draw the strip of paper from the supply roll 62, is mounted on a shaft 85 (Fig. 2) which is journaled through housing 61 at 61a to another journal connection 86a mounted on auxiliary housing 86. On the shaft 85 within the housing 86, there is mounted a timing drum 87 (see Fig. 5) provided with a plurality of holes 88 which may have inserted therein pegs 89 in any desired spacing. The shaft 85 is connected beyond the housing 86 to a drive motor, not shown, but identified schematically as element 98 in the electric circuit diagram of Fig. 4. The pegs 89 trip a stop microswitch 91 as the shaft 85 rotates. The spacing of the pegs 89 is selected to provide a degree of arc 92 (Fig. 5) which will provide, in the manner explained hereinafter, the appropriate length of paper desired to effectively span the mouth opening of the container.

Figure 4:
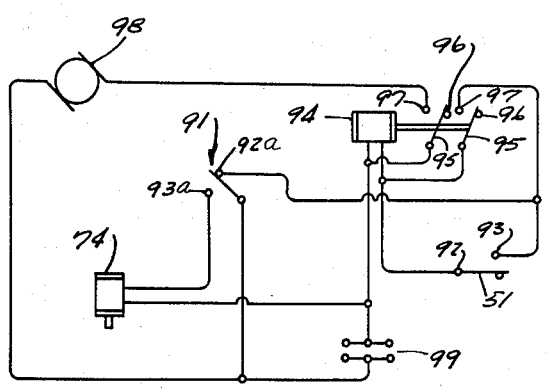
Fig. 4 is a schematic drawing of an electrical circuit which may be used to control the sequence of steps of the invention.
Figure 5:
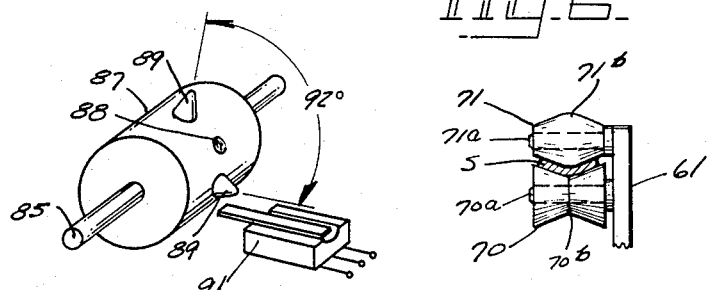
Fig. 5 is a perspective view illustrating schematically the stripping of a microswitch element used in providing automatic operation of the apparatus of the invention.

Referring now to Figs. 1 and 4, the timing operation is initiated, as indicated hereinbefore, by start microswitch 51, which is spring-loaded, and, when tripped, closes a circuit by connecting the pole 92 of the microswitch 51 to contact 93. This puts the coil of a hold relay 94 in series with a source of line current 99 through the normally closed contact 92a of stop microswitch 91. The holding relay causes the double pole switch elements 95 to move from an open position at contacts 96 to a closed position in contact with contacts 97. Holding relay 94 and the motor 98 are thus energized independently of start switch 51, which springs back and disconnects contacts 92 and 93, and, hence, the drive roller 69 is rotated to withdraw a length of paper from the roll supply 62. The motor 98 continues running until the spring-loaded stop microswitch 91 is tripped by a peg 89 (Fig. 5). This causes the switch blade of 91 to move from engagement with contact 92a into engagement with contact 93a. When the stop microswitch 91 is thus operated, however, it disconnects the flow of current through the holding relay 94, whereupon the switches 95 open and the motor stops. This causes rotation of drive wheel 66 to cease, and, accordingly, a preselected length of paper will have been unwound from the spring-held spool 62, and directed to the cutter 63. At the same time, stop microswitch blade in contact with contact 93 causes the line current from source 99 to flow through the solenoid 74, which propels the knife-blade downwardly, as described hereinbefore, to sever a length of paper from the roll. The microswitch 91 is spring-loaded to its other position, and has only to send an impulse to the solenoid 74, whereupon it immediately returns to its original position, and the entire circuit is thus restored to starting condition. Flow of current is not again initiated until the microswitch 51 is tripped by the passage of a bottle beneath the adhesive applicator roll (see Fig. 1). Accordingly, an important provision of the invention is accomplished, namely, that the dispensing of the pad of paper is initiated only when a bottle is going to be passed beneath the pad-dispenser unit 60.

It can be seen that the operation of the above-described equipment is automatic, and is very efficient. The supply of bottles only need be fed to the conveyor, whereupon the in-feed worm 21 will space them uniformly so that they are delivered in equidistantly, spaced-apart relationship on the conveyor to pass beneath the adhesive applicator unit, whereupon, in so passing, the microswitch signals, in effect, the disk or pad-dispensing unit 60 to deliver a single piece of paper of preselected length, generally designated P, to the conveyor belt 65, and such is passed downwardly, though held firmly, in timed sequence to meet the bottle passing therebeneath. The bottles can be spaced apart any distance by simply substituting a different worm gear having a different configuration of convolutions thereon. Then the distance between the adhesive applicator 30 and the pad-dispenser 61 is adjusted accordingly and easily. At the rearward end of the principal conveyor, the bottles may be delivered to a collecting area, not shown, and, as desired, removed and packed in corrugated cartons or the like for shipment to the customer.

Most desirably, the adhesive used in the practice of this invention is one which possesses a greater affinity to paper than to glass. This will insure that the customer may completely remove the temporary seal without having portions of the seal remaining adhered to the rim of the bottle. It will be appreciated that this would be undesirable in the filling operations employed by the customer, and, as well, would interfere in the application of the permanent cap or closure to the container filled with the customer's products. It has been found that a particular blend of adhesive materials provides the most desired preferred affinity for the paper, as compared to glass, to provide clean stripping. The adhesives used were both aqueous emulsions of acrylic resins. One was a non-ionic, acrylic ester resin emulsion in water, constituting 40% resin solids, produced and sold by Rohm & Haas Company under the code designation Rhoplex FRN. This adhesive forms a film at 0° C., and exhibits, when dry, a Tukon hardness of 0.56. It is classified as a tacky resin. The other resin was an ionically cross-linked, acrylic ester polymer emulsion in water, constituting 45% solids, produced and sold by Rohm and Haas under the code designation Rhoplex X-52. This adhesive forms a film at 25° C., and exhibits a Tukon hardness of 1.6. It is less tacky than the FRN resin. The above two resins are preferably combined in equal volumes and mixed thoroughly to provide an improved adhesive blend capable of performance as described above. The mixture of the two in proportions of 1:1 by volume, as indicated, is quite homogeneous, and is of desirable viscosity, so that the roller picks it up conveniently, and applies a uniform thickness to the rim of the bottle. The adhesive provides a very tight bond between the paper and the rim of the bottle, particularly when pressed firmly between the conveyors 64 and 10, and is concurrently heated by passage beneath the heater 65a. The optimum bond is obtained where the heat is such that the belt 65 in contact with the paper is maintained at a temperature of about 180° F. It will be appreciated that the only part of the paper that has adhesive bonded to it is that portion in contact with the rim. The portion spanning the opening of the bottle, and that portion extending beyond the outer margins of the rim of the bottle are free of adhesive. Accordingly, these portions do not collect dust and dirt particles as is the case with the adhesive strips used heretofore, which dirt collection only accentuates the possibility of contamination entering the containers when the adhesive strips are removed. Further, and of equal importance, the central portion of the pad of paper is free of adhesive so that the pores of the paper are unclogged and free to pass water vapor as prevailing conditions would dictate. In other words, the container, although effectively sealed to preclude entry of foreign objects, is free to breathe, as it were.

Modifications may be resorted to within the spirit and scope of the appended claims.

I claim:
1. Apparatus for applying a temporary seal to the mouth-defining rim of glass containers comprising: means for positioning a continuously advancing plurality of containers in upright, single-file, spaced-apart relationship in the direction of travel; roller means for applying a uniform coating of adhesive to the upwardly facing surface of said rim of said container; a switch located to be tripped in sequence by each container; a paper dispenser above said supply of bottles including means for holding a supply of paper in rolled strip form and advancing said strip in intermittent fashion, and severing means for converting said continuous, intermittently advanced strip to individual elements; means responsive to said switch for intermittently advancing said strip of paper and concurrently activating said severing means; a horizontally disposed, continuously operated conveyor located to receive said severed elements in its uppermost path and arranged to pass tangent to said rim on its lowermost path; vacuum means within said conveyor for holding said severed element in fixed, spaced relationship with respect to other paper elements as such are passed peripherally down about the end of said conveyor into contact with said rim of said container; and a source of heat for curing said adhesive and bonding said paper element to said container rim to thereby cover said mouth.

2. Apparatus for applying a temporary seal to the mouth-defining rim of glass containers comprising: conveyor means for continuously advancing a plurality of said glass containers; means for positioning said containers in upright, single-file, spaced-apart relationship in the direction of travel; roller means for applying a uniform coating of adhesive to the upwardly facing surface of the rim of each of said containers; a switch located to be tripped in sequence by each container; a paper dispenser above said supply of bottles including means for holding a supply of paper in rolled strip form and advancing said strip in intermittent fashion, and severing means for converting said continuous intermittently advanced strip to individual elements; means responsive to said switch for intermittently advancing said strip of paper and concurrently activating said severing means; a horizontally disposed, continuous conveyor located to receive said severed elements in its uppermost path, and arranged to pass tangent to said rim on its lowermost path, including a vacuum chamber within said conveyor having apertures therein, an endless conveyor belt having apertures, certain of which are adapted to register with said apertures in said chamber and thereby expose said severed element to said vacuum and hold said severed element in fixed, spaced relationship with respect to other paper elements as such are passed peripherally down about the end of said conveyor into contact with said rim of said container; and a source of heat within said conveyor for curing said adhesive and bonding said paper element to said rim to thereby cover said mouth.

3. Apparatus for applying a temporary seal to the mouth-defining rim of glass containers comprising: means for positioning a continuously advancing plurality of containers in upright, single-file, spaced-apart relationship in the direction of travel; roller means for applying a uniform coating of adhesive to the upwardly facing surface of said rim of said container; a paper dispenser above said supply of bottles including means for holding a supply of paper in rolled strip form, and advancing said strip in intermittent fashion, and severing means for converting said continuous, intermittently advanced strip to individual elements; means for intermittently advancing said strip of paper concurrently activating said severing means; a horizontally disposed, continuously operated conveyor located to receive said severed elements in its uppermost path, and arranged to pass tangent to said rim on its lowermost path; and vacuum means within said conveyor for holding said severed element in fixed, spaced relationship with respect to other paper elements as such are passed peripherally down about the end of said conveyor into contact with said rim of said container.

No references cited.